United States Patent
Kim

[19]

[11] Patent Number: 6,011,588
[45] Date of Patent: Jan. 4, 2000

[54] METHOD AND APPARATUS FOR CODING A CONTOUR OF AN OBJECT EMPLOYING TEMPORAL CORRELATION THEREOF

[75] Inventor: Jin-Hun Kim, Seoul, Rep. of Korea

[73] Assignee: Daewoo Electronics Co., Ltd., Seoul, Rep. of Korea

[21] Appl. No.: 08/867,787

[22] Filed: Jun. 3, 1997

[30] Foreign Application Priority Data

Apr. 11, 1997 [KR] Rep. of Korea ...................... 97-13369

[51] Int. Cl.[7] .............................. H04N 7/18; H04N 7/32
[52] U.S. Cl. .................... 348/390; 348/420; 348/699; 348/416; 348/402; 382/236; 382/242; 382/243; 382/240; 382/48
[58] Field of Search ................................. 348/390, 420, 348/416, 402, 699; 382/236, 242, 48, 243, 240

[56] References Cited

U.S. PATENT DOCUMENTS

| | | | |
|---|---|---|---|
| 5,295,201 | 3/1994 | Yokohama | 382/48 |
| 5,592,228 | 1/1997 | Dachiku et al. | 348/416 |
| 5,598,215 | 1/1997 | Watanabe | 348/416 |
| 5,633,685 | 5/1997 | Cho et al. | 348/420 |
| 5,737,449 | 4/1998 | Lee | 348/402 |
| 5,748,231 | 5/1998 | Park et al. | 348/208 |
| 5,754,701 | 5/1998 | Yokohama | 382/240 |
| 5,760,846 | 6/1998 | Lee | 348/699 |
| 5,799,109 | 8/1998 | Chung et al. | 382/243 |
| 5,805,736 | 9/1998 | Kim | 382/242 |
| 5,838,829 | 11/1998 | Kim | 382/242 |
| 5,881,174 | 3/1999 | Kim | 382/236 |
| 5,883,977 | 3/1999 | Kim | 348/402 |
| 5,929,917 | 7/1999 | Kim | 348/420 |

*Primary Examiner*—Bryan Tung
*Assistant Examiner*—Shawn S. An
*Attorney, Agent, or Firm*—Pennie & Edmonds LLP

[57] ABSTRACT

A method for encoding input contour image including a current contour based on a previous contour, the contour encoded previously, is provided. In this method a predicted contour is generated from motion estimating and compensating the previous contour based on the current contour. By indexing the contour pixels on the predicted contour and encoding the indices of the end-points of matched segments, parts where the predicted and the current contours overlap, encoded major vertex information is provided. Unmatched segments, parts on the current contour which are not included on any of the matching segments, are polygonal approximated to find minor vertices and relative location of the minor vertices are encoded to provide encoded minor vertex information. When encoding the minor vertices, modes for encoding the number of minor vertices are selected to minimize the number of bits for encoding the number of minor vertices. By multiplexing the encoded major vertex information and the encoded minor vertex information, the present method supplies encoded contour information.

17 Claims, 4 Drawing Sheets

METHOD AND APPARATUS FOR CODING A CONTOUR OF AN OBJECT EMPLOYING TEMPORAL CORRELATION THEREOF

FIELD OF THE INVENTION

The present invention relates to a method and apparatus for encoding a contour of an object expressed in a video signal; and, more particularly, to a method and apparatus capable of reducing the amount of transmission data through the use of a contour motion estimation technique based on temporal correlations between contours.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values.

Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique(see Michael Hötter, "Object-Oriented Analysis-Synthesis Coding Based on Moving Two-Dimensional Objects", *Signal Processing: Image Communication* 2, 409–428(December, 1990)).

According to the object-oriented analysis-synthesis coding technique, an input video image is divided into objects; and three sets of parameters for defining the motion, contour and pixel data of each object are processed through different encoding channels.

One example of the object-oriented analysis-synthesis coding technique is MPEG-4, which has been proposed to offer an audio-video encoding standard satisfying content-based interactivity and coding efficiency and/or generality in low bit-rate communication, interactive multimedia and area surveillance(see *MPEG-4 Video Verification Model Version 2.0*, International Organization for Standardization, ISO/IEC JTC1/SC29/WG11 N1260, March 1996).

According to MPEG-4, a video signal is divided into a plurality of video object planes(VOP's), wherein a VOP is an entity comprising bit streams a user can access and handle. A VOP can be referred to as an object and is represented as a bounding rectangle whose width and length are both 16N pixels, N being a positive integer. VOP's are processing units in an encoder. A VOP includes chrominance color information composed of luminance component Y and chrominance components Cr and Cb and contour information represented by, for example, a binary mask.

To process the video signal in units of VOP's, that is, in units of objects, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, contour encoding methods employing polygonal approximation techniques have been suggested. In polygonal approximation techniques, firstly, two starting vertex points A and B are selected. If the contour is of an open loop, two end points are selected as the starting vertex points. On the other hand, if the contour is in the form of a closed loop, two farthest points on the contour are selected as the starting vertex points. And then, a line segment AB is drawn between the two starting vertex points, wherein the line segment is a straight line connecting the two starting vertex points and a farthest point C on the contour from the line segment is determined. If the distance between the line segment AB and the point C is longer than a predetermined value $D_{max}$, the point C is selected as another vertex point. This procedure is repeated until the $D_{max}$ for each line segment connecting two adjacent vertex points becomes equal to or smaller than a predetermined threshold value TH1.

By employing the polygonal approximation method such as above, the amount of bits to be transmitted can be reduced. However, in a conventional polygonal approximation method a contour is polygonally approximated independently without considering its temporal correlation with contours in other frames. Therefore, in case contours included in two consecutive frames are highly correlated temporally, bits to be transmitted can still be substantially reduced by employing the temporal correlation between frames in encoding. That is, if a previous contour in a previous frame and a current contour in a current frame are mostly similar to each other except for some parts, amount of bits to be transmitted can further be reduced by coding the similar parts of the current contour using the previous contour.

SUMMARY OF THE INVENTION

It is, therefore, a primary object of the invention to provide a method and apparatus capable of reducing the amount of transmission data through the use of a contour motion estimation technique based on temporal correlation between contours.

In accordance with the present invention, there is provided a method for encoding input contour image including a current contour based on a previous contour, the contour encoded previously by generating a predicted contour from motion estimating and compensating the previous contour referring to the current contour. By indexing the contour pixels on the predicted contour and encoding the indices of the end-points of matched segments, parts where the predicted and current contours overlap, encoded major vertex information is provided. Unmatched segments, parts on the current contour not included on any of the matching segments, are polygonal approximated to find minor vertices and relative location of the minor vertices are encoded to provide encoded minor vertex information. When encoding the minor vertices, modes for encoding the number of minor vertices are selected to minimize the number of bits for encoding the number of minor vertices. By multiplexing the encoded major vertex information and the encoded minor vertex information, the present method supplies encoded contour information.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
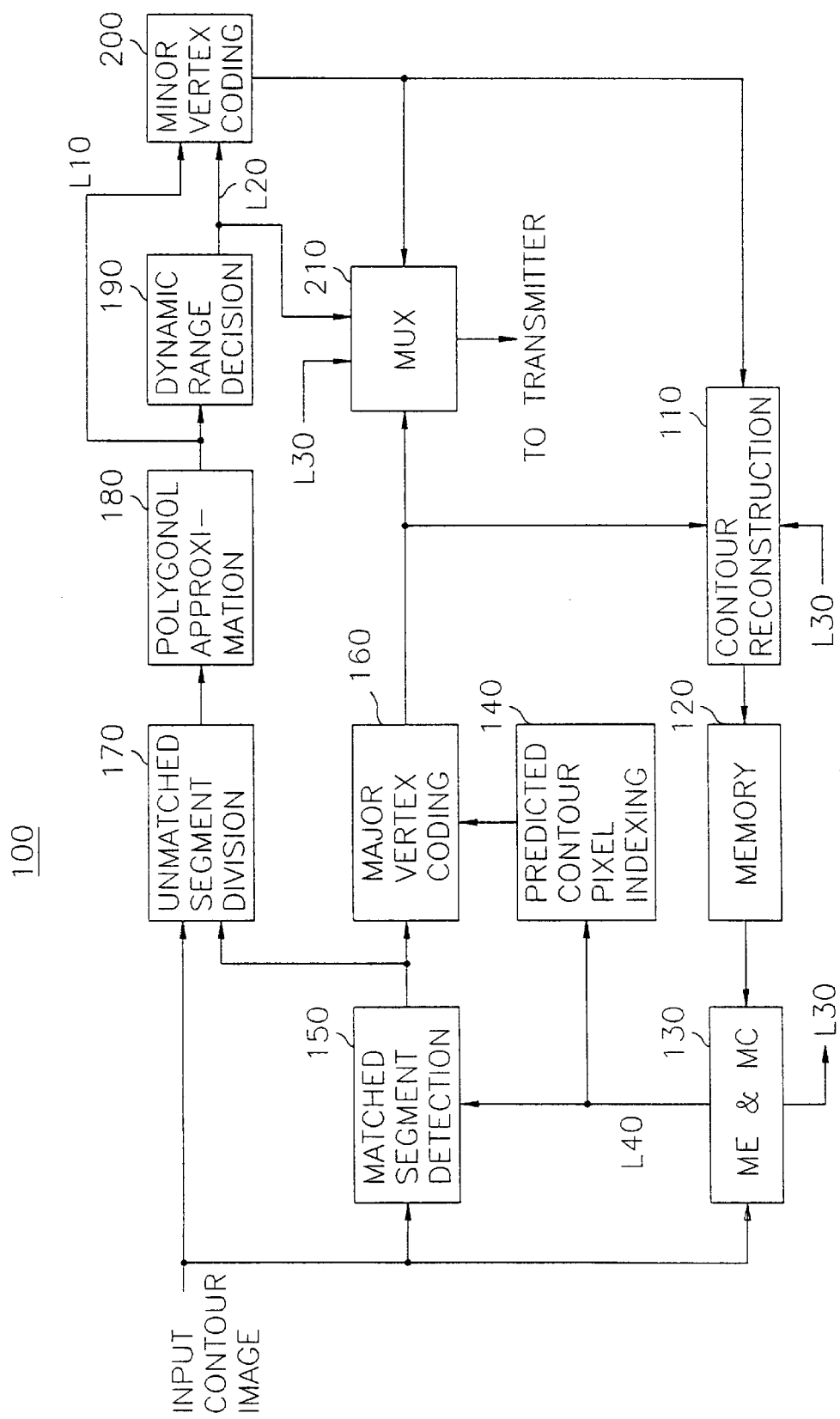
FIG. 1 represents a schematic block diagram of an apparatus for encoding input contour image in accordance with the present invention.

Referring to FIG. 1, there is shown a schematic block diagram of an inventive contour image encoding apparatus 100, wherein the contour image data inputted thereto represents locations of contour pixels composing a current contour. The input contour image is coupled to a motion estimation and motion compensation(ME & MC) block 130, a matched segment detection block 150 and an unmatched segment division block 170 of the contour image encoding apparatus 100.

Figure 2A:
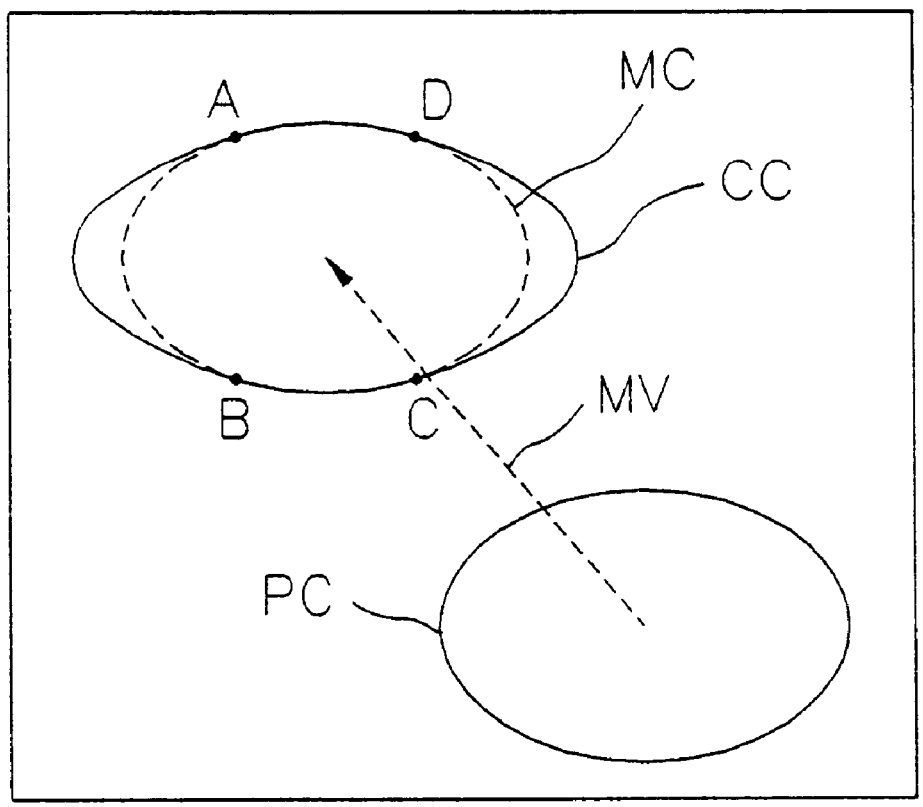
FIG. 2A shows an example of previous and current frames encoded by the apparatus in FIG. 1.
Figure 2B:
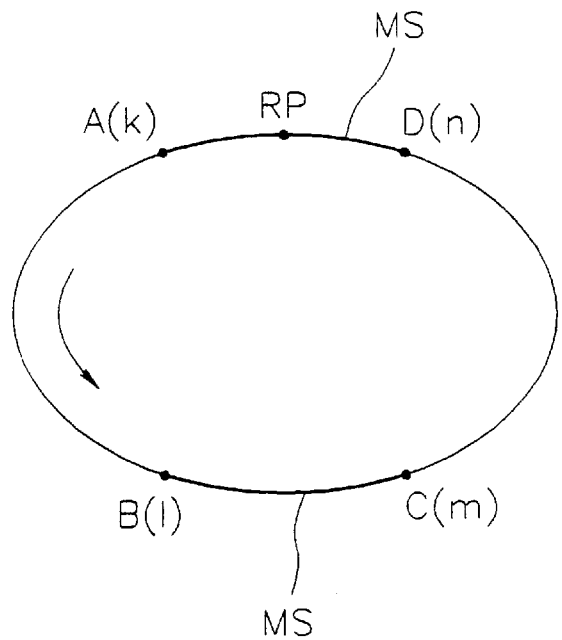
FIGS. 2B and 2C illustrate examples of matched and unmatched segments of the previous and the current contours encoded by the present invention.
Figure 2C:
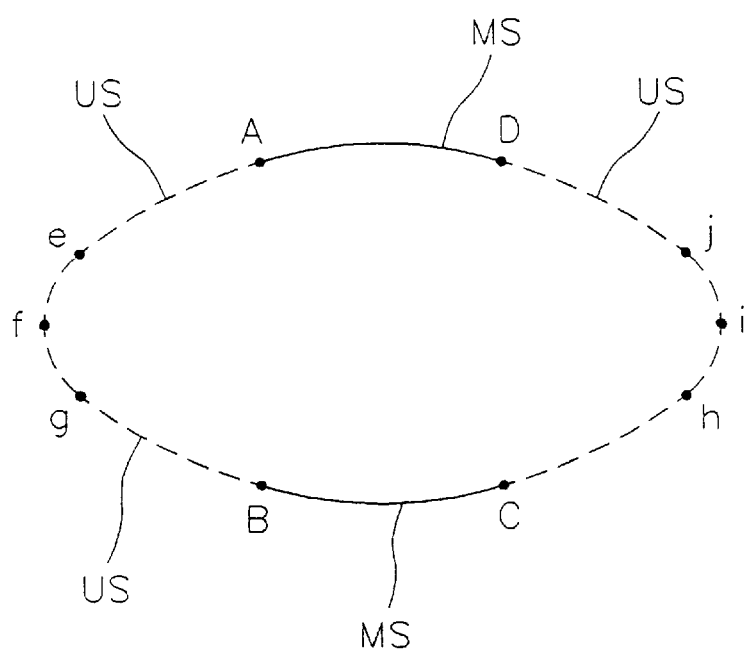

For the purpose of convenience, a contour pertaining to previous frame data, encoded prior to the input contour image, is referred to as a previous contour compared to the current contour, examples of which are depicted in FIG. 2.

The ME & MC block 130 finds a best matching between the previous and the current contours by shifting the previous contour toward the current contour. The ME & MC block 130, for example, finds centroids for the current and the previous contours, e.g., by averaging the position coordinates of all the contour pixels on each of the previous and current contours, respectively; and computes a motion vector denoting a spatial displacement between the centroids of the current and the previous contours. The centroid of the current contour is obtained based on the current contour included in the input contour image while the centroid of the previous contour is acquired based on the previous contour included in previous contour image reconstructed by a contour reconstruction block 110 and stored at a memory 120, wherein the previous contour image represents contour pixels and locations of vertices composing the previous contour. By overlapping the previous and the current contours based on the motion vector computed such as above, the ME & MC block 130, then, generates a motion-compensated previous contour or a predicated contour. In FIG. 2A, from the previous contour PC, a motion compensated previous contour MC is obtained based on the motion vector MV.

The motion vector from the ME & MC block 130 is coupled to the contour reconstruction block 110 and a multiplexor (MUX) 210 via a line L30. Meanwhile, the predicted contour image data, formed by the ME & MC block 130, representing contour pixels of the predicted contour is transferred to a predicted contour pixel indexing block 140 and the matched segment detection block 150 via a line L40.

The predicted contour pixel indexing block 140 assigns an index to each contour pixel on the predicted contour starting from a reference point RP by scanning the predicted contour image data inputted thereto. For instance, in FIG. 2B, starting from the reference point RP and going anti-clockwise, to four exemplary points A, B, C and D on the previous contour, indices k, 1, m and 1 are assigned, respectively. An index i indicates that the point is an i-th pixel starting from the RP, i being a non-negative integer. Therefore, if there are n pixels, n being an integer, on the predicted contour, they are given indices i to i+n going anti-clockwise beginning with the pixel immediately following the RP. Each pixel location and its index achieved such as above are coupled to a major vertex coding block 160 sequentially starting from the point with a smallest index.

Meanwhile, in response to the input contour image data and the predicted contour image data, the matched segment detection block 150 detects matched segments, wherein a matched segment corresponds to a group of adjacent pixels located at a same location on the current and predicted contours. And the number of pixels in the group must be over a predetermined number to be a matched segment. From the example of the MC or the predicted contour of FIG. 2A, two matched segments MS's are detected by the matched segments, which are depicted in solid curves in FIG. 2B. At the matched segment detection block 150, the length of a matched segment is usually required to be larger than a predetermined threshold value provided therein. In addition to the polygonal approximation method, when a discrete sine transformation(DST) method is employed in encoding, if the contour pixels on the current and the predicted contours are separated apart from each other within a predetermined range, it can be determined as a matched segment. The end-points of the matched segment determined such as above are defined as major vertices of the matched segment. The horizontal and vertical addresses of each pair of major vertices represent the matched segment thereof and form major vertex information for each matched segment. The major vertex information for all the matched segments with pairing information, indicating which major vertices, as a pair, form each matched segment, is coupled sequentially to the major vertex coding block 160 and the unmatched segment division block 170.

The major vertex coding block 160 encodes the major vertex information of each matched segment inputted thereto from the matched segment detection block 150 based on the indices coupled thereto from the predicted contour pixel indexing block 140. One of the matched segments has end-points corresponding to major vertices A(k) and D(n) while the other has B(l) and C(m) as end-points. The arrow represents the direction of the indexing carried out by the predicted contour pixel indexing block 140 starting from the RP, which, in turn, will indicate the encoding order of the major vertices at the major vertex coding block 160. To the first major vertex to be encoded A(k), bits enough to encode the total contour length(C) are assigned. However, to the next major vertex B(l) only bits enough to encode (C-k) are assigned. Likewise, to the major vertices C(m) and D(n), bits enough to encode (Cl) and (C-m) are assigned, respectively. The major vertex coding block 160 encodes the indices k, l, m and n of the major vertices A, B, C and D, respectively, with the bits assigned accordingly and sends encoded major vertex information to the MUX 210 with the pairing information transferred thereto from the matched segment detection block 150. In another preferred embodiment of the present invention, the major vertex coding block 160 can be changed to examine whether the RP is on a matched segment or not to obtain the pairing information instead of acquiring it from the matched segment detection block 150. If the RP is on a matched segment, then major vertices encoded first and last form a matched segment. And for all the other major vertices, the major vertices encoded consecutively form a matched segment. In the example given in FIG. 2B, the RP is on the matched segment. As a result, the major vertices encoded first and last, A and D, form a matched segment and the major vertices B and C, which are encoded consecutively, form another matched segment. The pairing information attained as such by the major vertex coding block 160 is also coupled to the MUX 210 with the encoded major vertex information.

The unmatched segment division block 170 segregates unmatched segments, parts where the current and predicted contours do not match with each other, based on the major vertex information and the pairing information inputted thereto from the matched segment detection block 150. The segregated unmatched segments are coupled to a polygonal approximation block 180 on a segment-by-segment basis. The polygonal approximation block 180 finds a plurality of minor vertices by employing a polygonal approximation technique to the unmatched segments, each forming an open loop on a segment-by-segment basis. From the polygonal approximation block 180, minor vertex information, representing locations of minor vertices found, is coupled to a dynamic range decision block 190 and a minor vertex coding block 200 via a line Lb. There is depicted an example of the unmatched segments(US's) and MS's of the current contour of FIG. 2A, drawn in dotted and solid curve, respectively, wherein the MS's are identical to the MS's of the predicted contour of FIG. 2B. And on the US, minor vertices e to j are found by the polygonal approximation block 180.

The dynamic range decision block 190 determines a dynamic range for coding each US on the current contour and sends the determined dynamic ranges to the minor vertex coding block 200 and the MUX 210 via a line L20.

The minor vertex coding block 200 encodes the minor vertex information, transferred thereto from the polygonal approximation block 180 on a segment-by-segment basis, to thereby supply encoded minor vertex information to the MUX 210 and a contour reconstruction block 110.

Figure 3:
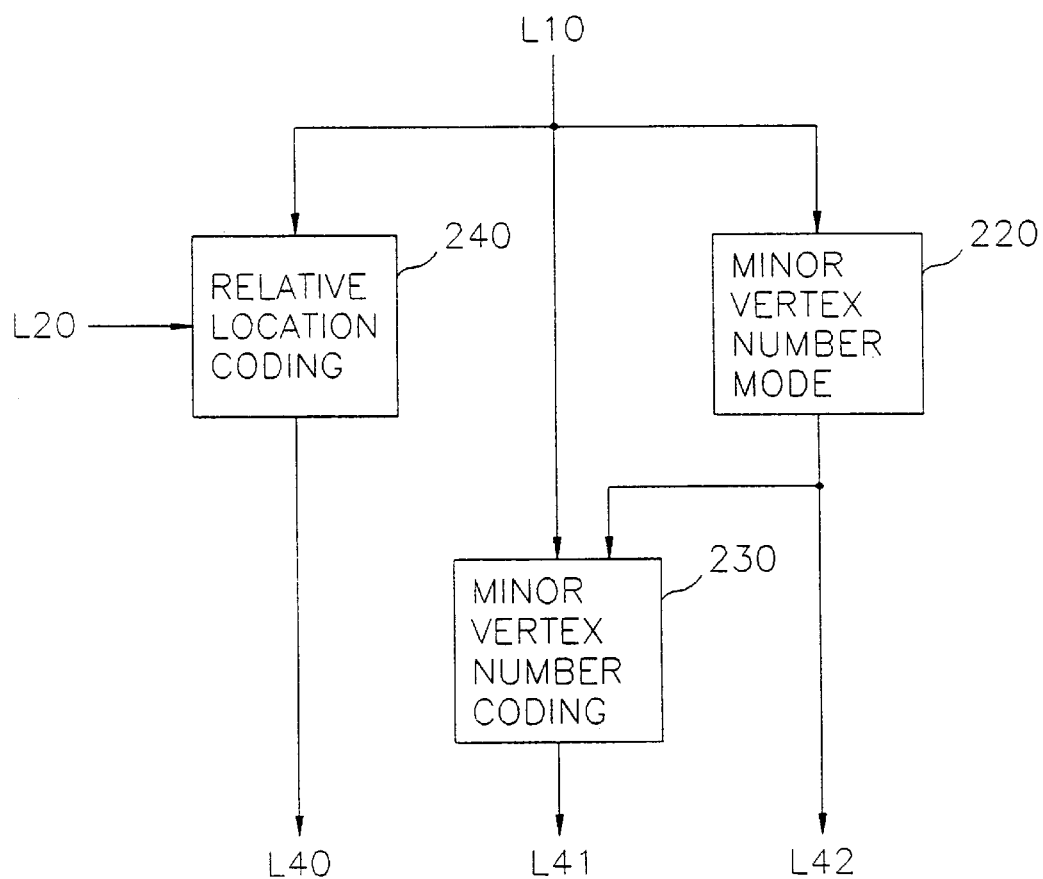
FIG. 3 presents a detailed block diagram of a minor vertex coding block shown in FIG. 1.

Referring to FIG. 3, there is illustrated a preferred embodiment of the minor vertex coding block 200 of FIG. 1, wherein a minor vertex number mode block 220, a minor vertex number coding block 230, and a relative location coding block 240 are included.

The minor vertex information on L10. is provided to all of the above three blocks of FIG. 3, that is, to the minor vertex number mode block 220, the minor vertex number coding block 230 and the relative location coding block 240. The dynamic ranges for coding each US's on the L20. are inputted to only the relative location coding block 240 of FIG. 3.

The relative location coding block 240 encodes the relative location of each minor vertex in the minor vertex information based on the corresponding dynamic range to thereby supply an encoded relative location of each minor vertex on a line L40. The relative location of a minor vertex represents a displacement from the minor vertex to a closest major or another minor vertex. These encoded relative locations are sequentially provided to the MUX 210 and the contour reconstruction block 110 via L40.

The minor vertex number mode block 220 and the minor vertex number coding block 230 encodes the minor vertex number mode and the actual number of minor vertices, respectively. Since the actual number of minor vertices are relatively small, the minor vertex mode number block 220, firstly, encodes a minor vertex number mode and provides the encoded minor vertex number mode m on a line L42, which is also provided to the minor vertex number coding block 230, m being a non-negative integer. Then, the minor vertex number coding block 230 encodes the actual number of minor vertices in $2^m$ bits. In this way, the number of bits transmitted can be effectively reduced. For instance, if there are 3 minor vertices, the minor vertex number mode block 220 encodes '1', and the minor vertex number coding block 230 encodes 3 using $2(=2^1)$ bits. Therefore, the encoded minor vertex number is '11', which is, then, provided on a line L41. In another instance, if there are 254 minor vertices, the minor vertex number mode block 220 encodes '3', and the minor vertex number coding block 230 encodes 254 in $8(=2^3)$ bits as '11111110'.

Referring back to FIG. 1, the MUX 210 multiplexes the encoded major vertex information and the pairing information from the major vertex coding block 160; the dynamic ranges for encoding each unmatched segment from the dynamic range decision block 190; the motion vector on L30 from the ME & MC block 130; and the encoded minor vertex information from the minor vertex coding block 200 to thereby provide encoded contour information for the current contour to be transmitted by a transmitter(not shown), wherein the encoded minor vertex information, transmitted sequentially for each unmatched segment, includes the encoded relative location of minor vertex on L40; the encoded minor vertex number on L41; and the encoded minor vertex number mode on L42.

In a decoder at a receiving end, the matched segments on the current contour are decoded firstly based on the encoded previous contour and the motion vector. And, secondly, the unmatched segments are decoded sequentially based on the corresponding dynamic ranges and the encoded minor vertex information to generate a complete decoded current contour.

Meanwhile, the contour reconstruction block 110 reconstructs the current contour in a similar way as described above for the decoder at the receiving end and couples the reconstructed contour to a memory 120 to be stored therein. The memory 120 stores the inputted reconstructed contour to be used in encoding the next current contour.

While the present invention has been described with respect to certain preferred embodiments only, other modifications and variations may be made without departing from the spirit and scope of the present invention as set forth in the following claims.

What is claimed is:

1. A method for encoding input contour image representing a current contour of an object based on a previous contour of said object, comprising the steps of:

(a) motion estimating and motion compensating the previous contour from the current contour to provide a predicted contour;

(b) detecting each of matched segments of the predicted and the current contours, a matched segment representing a contour part wherein the current and the previous contours overlap with each other, to generate endpoints of each matched segment as a pair of major vertices representing said each matched segment;

(c) encoding the pairs of major vertices based on said predicted contour; and (d) segregating from the current contour all of unmatched segments, an unmatched segment representing a segment which is not overlapping with any of the matched segments, and encoding all the unmatched segments.

2. The method according to claim 1, wherein the step (a) includes the steps of:

(a1) finding centroids of the current and the previous contours by averaging position coordinates of all the pixels on each of the contours;

(a2) computing a displacement between the centroids of the current and the previous contours; and (a3) overlapping the centroids of the current and the previous contours to provide the predicted contour.

3. The method according to claim 1, wherein the step (c) includes the steps of:

(c1) setting a contour pixel on the predicted contour as a reference point;

(c2) giving an index to each contour pixel on the predicted contour to thereby represent consecutive contour pixels with consecutive indices having a predetermined order starting from the reference point processing in a preset direction; and (c3) encoding the indices of the major vertices forming said each pair for all the pairs of major vertices.

4. The method according to claim 3, wherein each matched segment is larger than a predetermined threshold value.

5. The method according to claim 1, wherein the step (d) includes the step of:

(d1) polygonal approximating the unmatched segments to generate a plurality of minor vertices; and (d2) encoding said minor vertices.

6. The method according to claim 5, wherein the step (d2) has:

(d21) calculating a dynamic range for encoding each minor vertex; and (d22) encoding relative location of each minor vertex in bits allocated by the dynamic range calculated at the step (d21), wherein the relative location of the minor vertex represents a displacement from said each minor vertex to a closest major or another minor vertex.

7. The method according to claim 6, wherein the step (d22) contains the steps of:

allocating bits for encoding each minor vertex according to the corresponding dynamic calculated at the step (d21);

encoding the relative location of each minor vertex with the bits allocated by the allocating bits;

deciding minor vertex number mode, which determines bits for encoding a number of minor vertices; and encoding the number of minor vertices based on the minor vertex number mode.

8. An apparatus for encoding input contour image representing locations of contour pixels composing a current contour based on a previous contour representing locations of contour pixels constituting a previously encoded contour to thereby provide encoded contour information, which comprises:

predicted contour generation means for generating a predicted contour by motion estimating and motion compensating the previous contour based on the current;

indexing means for indexing contour pixels on the predicted contour starting from a reference point and going sequentially in a preset direction;

matched segment detection means for detecting each of matched segments of the current and the predicted contours, a matched segment representing a contour part wherein the current and the predicted contours overlap with each other, and providing end-points of each matched segment as a pair of major vertices;

major vertex coding means for sequentially coding indices of the major vertices given by the indexing means to thereby provide encoded major vertex information including pairing information representing which pair of major vertices form each matched segment;

unmatched segment detection means for detecting each of unmatched segments, an unmatched segment representing a segment which is not included in any of the matched segments;

polygonal approximation means for polygonal approximating each of the unmatched segments to thereby detect minor vertices;

minor vertex coding means for encoding the minor vertices to thereby provide encoded minor vertex information; and multiplexing means for combining the encoded major vertex information and the encoded minor vertex information as said encoded contour information.

9. The apparatus according to claim 8, wherein the predicted contour generation means includes:

means for finding centroids of the current and the previous contours by averaging position coordinates of all the pixels on each of the contours;

means for computing a displacement between the centroids of the current and the previous contours; and means for moving the previous contour by the displacement computed by the computing means to thereby provide the predicted contour.

10. The apparatus according to claim 9, wherein the indexing means includes:

means for determining a contour pixel on the predicted contour as said reference point;

means for giving a contour pixel closest to the reference point in the preset direction an index i, i being a non-negative integer;

means for giving an adjacent contour pixel to the pixel i in the preset direction an index i+1; and means for going in the preset direction and repeating the above indexing procedure until all the contour pixels on the predicted contours have indices i to i+n, n being an integer representing the number of contour pixels on the predicted contour.

11. The apparatus according to claim 10, wherein the preset direction is anti-clockwise.

12. The apparatus according to claim 11, wherein each matched segment is larger than a predetermined threshold value.

13. An apparatus for encoding a current contour included in input contour image to thereby provide encoded contour information by referring to a previous contour, a contour encoded previously, wherein a predicted contour is generated by motion estimating and motion compensating the current contour based on the previous contour, which comprises:

means for indexing contour pixels on the previous contour;

means for deciding major vertices of the predicted contour by matching the predicted contour with the previous contour to thereby detect matched segments, a matched segment representing a contour part where the two contours overlap with each other, and providing end-points of the matched segments as the major vertices;

means for deciding minor vertices of the predicted contour by polygonal approximating unmatched segments, an unmatched segment representing a contour segment which does not overlap with any of the matched segments found by the major vertex decision means;

means for encoding the indices given by the indexing means to the contour pixels at locations of the major vertices to thereby provide encoded major vertex information;

means for calculating a dynamic range for encoding each minor vertex, wherein the dynamic range allocates bits for encoding the corresponding minor vertex;

a minor vertex location encoding means for encoding relative location of each minor vertex with bits allocated by the corresponding dynamic range, wherein the relative location of the minor vertex represents a displacement from said each minor vertex to a closest major or another minor vertex;

a decision means for deciding minor vertex number mode which determines bits for encoding the number of minor vertices; and a minor vertex number encoding means for encoding the number of minor vertices based on the minor vertex number mode.

14. The apparatus according to claim 13, wherein the indexing means includes:

means for determining a contour pixel on the previous contour as a reference point;

means for giving a contour pixel closest to the reference point in a preset direction an index i, i being a non-negative integer;

means for giving an adjacent contour pixel to the pixel i in the preset direction an index i+1; and means for repeating the above procedure until all the contour pixels on the previous contours have indices i to i+n, n being an integer representing the number of contour pixels on the previous contour.

15. The apparatus according to claim 14, wherein the matched segment is larger than a predetermined threshold value.

16. The apparatus according to claim 15, wherein the encoded major vertex information includes pairing information designating which major vertices, as a pair, form each matched segment.

17. The apparatus according to claim 16 further including:

means for multiplexing the encoded relative locations of the minor vertices, the encoded minor vertex number mode, and the encoded minor vertex number as encoded minor vertex information; and means for combining the encoded major vertex information and the encoded minor vertex information to render as said encoded contour information.

* * * * *